(12) United States Patent
Isomura et al.

(10) Patent No.: US 10,138,775 B2
(45) Date of Patent: Nov. 27, 2018

(54) HOLDING MATERIAL, METHOD FOR PRODUCING SAME, AND GAS TREATMENT DEVICE USING SAME

(71) Applicant: NICHIAS CORPORATION, Tokyo (JP)

(72) Inventors: Kazutoshi Isomura, Tokyo (JP); Hiroki Nakamura, Tokyo (JP); Kiyoshi Sato, Tokyo (JP); Isami Abe, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 0 days.

(21) Appl. No.: 15/321,277

(22) PCT Filed: Jun. 11, 2015

(86) PCT No.: PCT/JP2015/002930
§ 371 (c)(1),
(2) Date: Dec. 22, 2016

(87) PCT Pub. No.: WO2016/002137
PCT Pub. Date: Jan. 7, 2016

(65) Prior Publication Data
US 2017/0138234 A1 May 18, 2017

(30) Foreign Application Priority Data

Jun. 30, 2014 (JP) .................................. 2014-133676

(51) Int. Cl.
*F01N 3/021* (2006.01)
*F01N 3/28* (2006.01)
(Continued)

(52) U.S. Cl.
CPC ........ *F01N 3/0211* (2013.01); *B01D 39/2082* (2013.01); *B01D 46/0005* (2013.01);
(Continued)

(58) Field of Classification Search
CPC ............. F01N 2310/02; F01N 2310/04; F01N 3/2022; F01N 3/035
(Continued)

(56) References Cited

U.S. PATENT DOCUMENTS

2003/0185724 A1 10/2003 Anji et al.
2006/0257298 A1 11/2006 Merry
(Continued)

FOREIGN PATENT DOCUMENTS

JP 2003-286837 A 10/2003
JP 2007-504400 A 3/2007
(Continued)

OTHER PUBLICATIONS

Sep. 15, 2015 International Search Report issued in International Patent Application No. PCT/JP2015/002930.
(Continued)

*Primary Examiner* — Tom P Duong
(74) *Attorney, Agent, or Firm* — Oliff PLC

(57) ABSTRACT

A holding material includes a stack of a first mat and a second mat, the first mat including alumina fibers that include 60 wt % or more of alumina and 40 wt % or less of silica, and the second mat including silica fibers that include 60 wt % or more of silica and 40 wt % or less of alumina and having a surface pressure higher than that of the first mat as measured at a gap bulk density of 0.30 g/cm$^3$.

7 Claims, 2 Drawing Sheets

(51) Int. Cl.
  *B01D 39/20* (2006.01)
  *B01D 46/00* (2006.01)
  *F01N 3/022* (2006.01)
  *F01N 3/035* (2006.01)
  *B01D 53/94* (2006.01)
  *B32B 5/26* (2006.01)
  *D04H 1/4209* (2012.01)
  *D04H 1/58* (2012.01)

(52) U.S. Cl.
  CPC ....... *B01D 46/0027* (2013.01); *F01N 3/0217* (2013.01); *F01N 3/0226* (2013.01); *F01N 3/035* (2013.01); *F01N 3/28* (2013.01); *F01N 3/285* (2013.01); *F01N 3/2864* (2013.01); *B01D 53/94* (2013.01); *B01D 2239/0208* (2013.01); *B01D 2239/065* (2013.01); *B01D 2239/10* (2013.01); *B01D 2279/30* (2013.01); *B32B 5/26* (2013.01); *D04H 1/4209* (2013.01); *D04H 1/58* (2013.01); *F01N 2330/06* (2013.01); *F01N 2510/06* (2013.01)

(58) Field of Classification Search
  USPC ................................................. 422/179, 180
  See application file for complete search history.

(56) References Cited

U.S. PATENT DOCUMENTS

2009/0257925 A1* 10/2009 Sugino ................. F01N 3/0211
                                                          422/180
2009/0304560 A1   12/2009 Dietz
2011/0126499 A1    6/2011 Kumar
2011/0150715 A1*   6/2011 Kumar .................... B32B 5/26
                                                          422/168

FOREIGN PATENT DOCUMENTS

JP    2009-257422 A    11/2009
JP    2009-539031 A    11/2009
JP    2013-506076 A     2/2013

OTHER PUBLICATIONS

Jan. 3, 2017 International Preliminary Report on Patentability issued in International Patent Application No. PCT/JP2015/002930.

* cited by examiner 2  1  3A 3B
        \_/
         3

HOLDING MATERIAL, METHOD FOR PRODUCING SAME, AND GAS TREATMENT DEVICE USING SAME

TECHNICAL FIELD

The invention relates to a holding material for a processing structure that is used for a gas treatment device for purifying exhaust gas discharged from an automobile or the like, for example.

BACKGROUND ART

A gas treatment device for purifying exhaust gas is provided to a vehicle (e.g., automobile) in order to remove a toxic substance (e.g., carbon monoxide, hydrocarbon, and nitrogen oxide) included in exhaust gas discharged from the engine. Such a gas treatment device normally includes a processing structure (e.g., catalyst carrier) that is formed to have a tubular shape, a metal casing that accommodates the processing structure, and a holding material that is arranged in the processing structure, and placed in the gap between the processing structure and the casing.

The holding material that is placed in the gap between the processing structure and the casing is required to have a function of reliably (safely) holding the processing structure so as to prevent a situation in which the processing structure collides with the casing and breaks due to vibrations and the like that occur when the automobile is running, and a sealing function that ensures that leakage of unpurified exhaust gas from the gap between the processing structure and the casing does not occur. In order to reliably (safely) hold the processing structure, it is necessary to hold the processing structure with a specific surface pressure. However, a decrease in surface pressure occurs due to repeated compression caused by heating.

A holding material produced by forming ceramic fibers (e.g., alumina fibers or silica fibers) in the shape of a mat having a specific thickness has been mainly used as the holding material. A method that utilizes two types of mats in combination has been proposed in order to provide an additional function. For example, Patent Literature 1 discloses using mats that differ in length in combination in order to improve a winding capability. Patent Literature 2 discloses using mats that differ in thermal resistance in combination in order to improve thermal resistance. Patent Literature 3 discloses using a mat that includes bio-soluble fibers and a mat that includes non-respirable fibers in combination in order to improve safety.

CITATION LIST

Patent Literature

Patent Literature 1: JP-A-2009-539031
Patent Literature 2: JP-A-2003-286837
Patent Literature 3: JP-A-2013-506076

SUMMARY OF INVENTION

An object of the invention is to provide a holding material that decreases in surface pressure to only a small extent due to heating, a method for producing the same, and a gas treatment device that utilizes the holding material.

The inventors conducted extensive studies, and found that a decrease in surface pressure can be reduced or suppressed when the holding material has a structure in which a first mat that is formed of alumina fibers, and a second mat that is formed of silica fibers and has a surface pressure higher than that of the first mat, are stacked. This finding has led to the completion of the invention.

The invention provides the following holding material and the like.

1. A holding material comprising a stack of a first mat and a second mat, the first mat comprising alumina fibers that comprise 60 wt % or more of alumina and 40 wt % or less of silica, and the second mat comprising silica fibers that comprise 60 wt % or more of silica and 40 wt % or less of alumina, and having a surface pressure higher than that of the first mat as measured at a gap bulk density of 0.30 $g/cm^3$.

2. The holding material according to 1, wherein either or both of the first mat and the second mat further comprise 1 to 20 wt % of an organic binder.

3. The holding material according to 1 or 2, having a thickness of 6 mm to 20 mm.

4. The holding material according to any one of 1 to 3, the holding material being a cylindrical laminate in which the first mat is situated on an inner side, and the second mat is situated on an outer side.

5. The holding material according to any one of 1 to 4, the holding material being to be used for a gas treatment device.

6. A method for producing a holding material comprising:

producing a first mat using alumina fibers that comprise 60 wt % or more of alumina and 40 wt % or less of silica;

producing a second mat using silica fibers that comprise 60 wt % or more of silica and 40 wt % or less of alumina, the second mat having a surface pressure higher than that of the first mat; and stacking and bonding the first mat and the second mat.

7. A gas treatment device comprising:

a processing structure that is formed to have a tubular shape;

a casing that accommodates the processing structure therein; and the holding material according to any one of 1 to 5 that is placed in a gap between the processing structure and the casing, the first mat of the holding material being situated to come in contact with the processing structure.

8. The gas treatment device according to 7, wherein the processing structure is a catalyst carrier or an exhaust gas filter.

The invention thus provides a holding material that decreases in surface pressure to only a small extent due to heating, a method for producing the same, and a gas treatment device that utilizes the holding material.

DESCRIPTION OF EMBODIMENTS

The holding material according to the invention is described in detail below.

Figure 1:
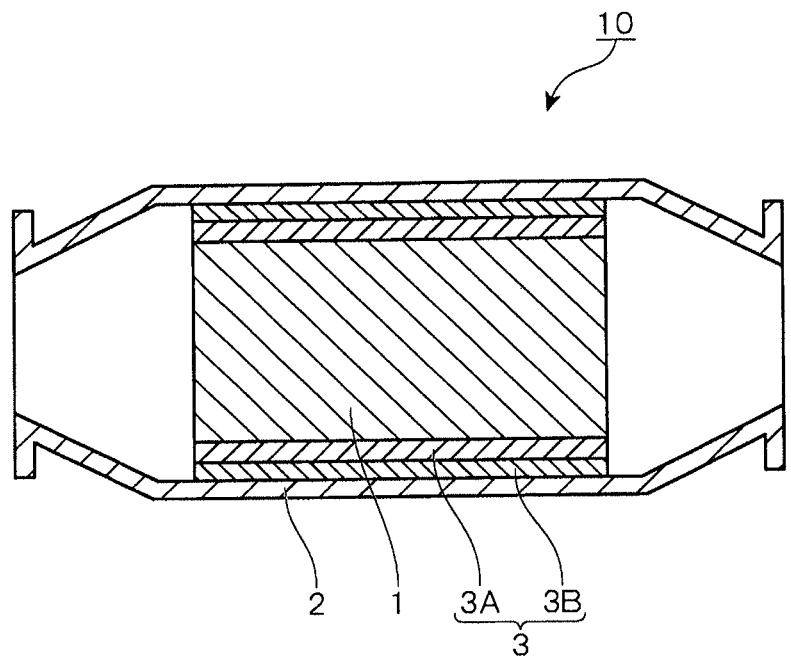
FIG. 1 is a cross-sectional view schematically illustrating a gas treatment device according to one embodiment of the invention that includes a holding material according to the invention.

FIG. 1 is a cross-sectional view schematically illustrating a gas treatment device according to one embodiment of the invention that includes a holding material according to the invention. A gas treatment device 10 illustrated in FIG. 1 includes a processing structure 1 that is formed to have a tubular shape, a casing 2 that holds the processing structure 1, and a holding material 3 that is fitted to the processing structure 1, and placed in the gap between the processing structure 1 and the casing 2. The holding material 3 according to the invention includes an alumina fiber mat 3A (first mat) and a silica fiber mat 3B (second mat) that are stacked one on top of the other.

The gas treatment device 10 is used to remove a toxic substance and/or particles included in a gas. For example, the gas treatment device 10 is an exhaust gas treatment device that is provided in a vehicle (e.g., automobile), and removes a toxic substance and/or particles included in exhaust gas that is discharged from an internal combustion engine (e.g., gasoline engine or diesel engine).

For example, the gas treatment device 10 is a catalytic converter that is used to remove a toxic substance included in exhaust gas discharged from a gasoline engine, or a diesel particulate filter (DPF) that is used to remove particles included in exhaust gas discharged from a diesel engine.

The processing structure 1 is a structure having a gas processing function. When the gas treatment device 10 is a catalytic converter, the processing structure 1 is a catalyst carrier that includes a catalyst for purifying a gas, and a carrier that supports the catalyst.

When the gas treatment device 10 is a DPF, the processing structure 1 is a structure that includes a filter that traps particles included in a gas. In this case, the processing structure 1 may include a catalyst.

The casing 2 is made of a metal such as stainless steel, iron, or aluminum, for example. The casing 2 may be divided into a plurality of parts.

The holding material 3 is used to hold the processing structure 1 inside the casing 2. Specifically, the holding material 3 is placed in the gap between the processing structure 1 and the casing 2 in a compressed state to stably hold the processing structure 1 inside the casing 2.

The holding material according to the invention is a laminate that includes the alumina fiber mat 3A and the silica fiber mat 3B that include inorganic fibers as the main component. The laminate may be formed to have a flat sheet-like shape. When holding the processing structure 1, the holding material is normally wound to have a cylindrical shape such that the alumina fiber mat 3A comes in contact with the processing structure 1. Note that the holding material may be formed to have a cylindrical shape in which the alumina fiber mat 3A is situated on the inner side, and the silica fiber mat 3B is situated on the outer side.

The alumina fibers used in the invention are inorganic fibers that include alumina and silica in a ratio of 60 to 100 wt % and 0 to 40 wt %, respectively. The alumina fibers preferably include alumina and silica in a ratio of 70 to 98 wt % and 2 to 30 wt %, respectively. For example, inorganic fibers that include alumina and silica in a ratio of 90 to 98 wt % and 2 to 10 wt %, respectively, may be used.

The alumina fibers preferably include alumina and silica in a total ratio of 98 wt % or more, or 100 wt % (including inevitable impurities).

The silica fibers used in the invention are inorganic fibers that include alumina and silica in a ratio of 0 to 40 wt % and 60 to 100 wt %, respectively. The silica fibers preferably include alumina and silica in a ratio of 0 to 10 wt % and 90 to 100 wt %, respectively. For example, inorganic fibers that include alumina and silica in a ratio of 0 to 5 wt % and 95 to 100 wt %, respectively, may be used.

The silica fibers preferably include alumina and silica in a total ratio of 98 wt % or more, or 100 wt % (including inevitable impurities).

The silica fibers used in the invention are selected so that a mat produced from the silica fibers using the method described later in connection with Comparative Example 2 has a surface pressure higher than that a mat produced from the alumina fibers used in the invention using the method described later in connection with Comparative Example 1. Here, this "surface pressure" refers to a surface pressure at a gap bulk density of 0.30 g/cm$^3$. The surface pressure can be measured using the method described later in connection with Comparative Example 1.

The surface pressure of the silica fiber mat at a gap bulk density of 0.30 g/cm$^3$ is preferably higher than that of the alumina fiber mat by a factor of 1.2 or more, and more preferably 1.3 or more. The surface pressure of the silica fiber mat at a gap bulk density of 0.40 g/cm$^3$ is preferably higher than that of the alumina fiber mat by a factor of 1.4 or more. The upper limit is not particularly limited. The surface pressure of the silica fiber mat is normally higher than that of the alumina fiber mat by a factor of 2.5 or less.

It is preferable to increase the strength of the silica fibers by heating the silica fibers in advance.

The first mat and the second mat may include an inorganic binder, an organic binder, an aggregating agent, and the like in addition to the inorganic fibers.

Examples of the inorganic binder include an alumina sol, a silica sol, and the like. Examples of the organic binder include a rubber-based material, a water-soluble organic polymer compound, a thermoplastic resin, a thermosetting resin, and the like.

A small amount of organic fibers such as pulp may be added as the organic binder. Examples of the aggregating agent include a polyacrylamide-based polymer compound and the like.

The holding material according to the invention, the first mat or the second mat may include the inorganic fibers in a ratio of 80 wt % or more, or 90 wt % or more, or 100 wt % (including inevitable impurities).

The holding material according to the invention, the first mat or the second mat may include the organic binder in a ratio of 1 to 20 wt %, preferably 2 to 15 wt %, and more preferably 5 to 13 wt %. If they include a large amount of organic binder, the capability to be wound around the catalyst carrier is improved, but the organic binder may be carbonized when decomposition of the organic binder has occurred, whereby a decrease in surface pressure may occur. The invention can reduce or suppress a decrease in surface pressure that may occur when the organic binder disappears.

The holding material according to the invention, the first mat or the second mat may include the inorganic fibers and the organic binder in a total ratio of 90 wt % or more, or 95 wt % or more, or 100 wt % (including inevitable impurities). The holding material according to the invention may be calcined to burn down the organic binder, for example.

The density of the alumina fiber mat 3A and the silica fiber mat 3B used in connection with the invention, the ratio of the thickness of the alumina fiber mat 3A to the thickness of the silica fiber mat 3B, and the total thickness of the holding material 3 may be appropriately set taking account of the size and the operating temperature of the gas treatment device to which the holding material 3 is applied, and the like.

The thickness of the holding material is not particularly limited, but is normally 6 mm to 20 mm. The thickness of the alumina fiber mat and the thickness of the silica fiber mat are normally 3 mm to 10 mm. The thickness of the alumina fiber mat and the thickness of the silica fiber mat may be identical to each other, or may be different from each other. In order that thermal resistance due to the alumina fiber mat 3A and a high surface pressure due to the silica fiber mat 3B are achieved in a well-balanced manner, it is preferable that the thickness of the alumina fiber mat 3A account for 35 to 80% of the total thickness of the holding material, and the thickness of the silica fiber mat 3B account for 20 to 65% of the total thickness of the holding material.

The weight per area of the alumina fiber mat 3A and the weight per area of the silica fiber mat 3B are normally 400 to 2,000 $g/m^2$, and preferably 400 to 1,600 $g/m^2$.

The holding material according to the invention is preferably used in a state in which the alumina fiber mat is situated on the inner side (i.e., facing toward the processing structure), and the silica fiber mat is situated on the outer side (i.e., facing toward the casing).

The alumina fiber mat used in connection with the invention has a thermal resistance higher than that of the silica fiber mat, but has a surface pressure lower than that of the silica fiber mat. The silica fiber mat has a thermal resistance lower than that of the alumina fiber mat, but has a surface pressure higher than that of the alumina fiber mat. The holding material is placed between the processing structure and the casing in a compressed state. The gas treatment device may be heated up to 1,000° C. during use. Since the casing made of a metal expands during heating, the degree of compression decreases. The gas treatment device is cooled after use, and the degree of compression increases when the casing has shrunk. In the invention, the alumina fiber mat mainly collapses when the degree of compression increases. That is, the alumina fibers collapse and break, while the silica fibers do not collapse and break and the silica fiber mat maintains the high surface pressure. The alumina fiber can function as a cushion material with respect to load.

Engine exhaust gas (hot air) passes through the catalyst carrier. The casing is heated due to metal heat transfer and the like, but becomes lower in temperature than the catalyst carrier through heat dissipation. Since the holding material is an insulating material, the holding material does not transmit a high temperature that occurs in the vicinity of the catalyst to the casing. Specifically, the holding material has a different temperature distribution in the direction of the thickness of the holding material (i.e., the holding material has a high temperature on the side of the catalyst (around the catalyst), and has a low temperature on the side of the casing (around the casing)). According to the invention, since the alumina fibers that exhibit high thermal resistance are provided on the side of the catalyst, and the silica fibers that exhibit low thermal resistance are provided on the side of the casing, it is possible to allow the entire holding material to exhibit a thermal resistance almost equal to that of a holding material that is produced using only alumina fibers.

Since a gasoline-fueled vehicle normally discharges a high-temperature exhaust gas, silica fibers cannot be used for a holding material that is applied to a gasoline-fueled vehicle. However, silica fibers can be applied to a temperature that occurs on the side of the casing. Specifically, since the holding material according to the invention has a two-layer structure, the holding material can be applied to a gasoline-fueled vehicle. Since the silica fibers have high surface pressure, the holding force can be improved as compared with a holding material that includes only a single layer formed of alumina fibers.

When the gap between the casing and the processing structure is large (i.e., gap open state), the surface pressure increases since the silica layer is present. The surface pressure in the gap open state is designed to be low to a degree that the processing structure does not fall off. According to the invention, it is possible to achieve a holding capability equal to that of a conventional product even when the basis weight (weight per area) is reduced comparing to the conventional product, since the surface pressure is high. It is possible to achieve a reduction in cost as a result of decreasing the weight per area.

As described above, a holding material formed of only an alumina layer exhibits excellent thermal resistance, but has low surface pressure, and a holding material formed of only a silica layer exhibits low thermal resistance (that cannot be applied to a gasoline-fueled vehicle), but has high surface pressure. According to the invention, since these layers are stacked, it is possible to achieve an effect specific to a laminate that reduces or suppresses a decrease in surface pressure when the organic binder is decomposed while maintaining excellent thermal resistance and high surface pressure possessed by the respective layers.

The holding material according to the invention may be produced using an arbitrary method. For example, the holding material according to the invention may be produced using the following method.

Specifically, two mats are produced separately, stacked one on top of the other, and bonded at the interface to obtain a holding material in which the mats are stacked. The mats may be bonded using an adhesive, a stitching technique, or the like. For example, a slurry that includes alumina fibers and an organic binder is prepared, and subjected to dehydration forming to obtain a wet alumina fiber mat. A wet silica fiber mat is obtained in the same manner as the wet alumina fiber mat. The wet alumina fiber mat and the wet silica fiber mat are stacked, and heat-pressed to melt the organic binder situated around the interface between the mats. The resulting laminate is compressed to have a certain thickness.

Alternatively, a mat may be formed directly on another mat to obtain a holding material in which the mats are stacked. For example, a slurry that includes alumina fibers and an organic binder is prepared, subjected to dehydration forming, and dried to obtain the alumina fiber mat 3A. A silica fiber-containing slurry is applied to one side of the alumina fiber mat 3A, subjected to dehydration forming, and dried to obtain a laminate including the alumina fiber mat 3A and the silica fiber mat 3B. The resulting laminate is compressed to have a certain thickness.

The holding material according to the invention is normally in the shape of a sheet. Note that the holding material according to the invention may be formed to have a tubular shape. In this case, a cylindrical mesh member (e.g., cylindrical wire gauze) is immersed in the above alumina fiber-containing slurry. Then the cylindrical mesh member with a part of the slurry is removed from the slurry, subjected to dehydration forming, and dried to produce a cylindrical alumina fiber mat 3A. A silica fiber-containing slurry is applied to the outer surface of the cylindrical alumina fiber mat 3A, subjected to dehydration forming, and dried. The cylindrical mesh member is then removed to obtain a cylindrical laminate in which the alumina fiber mat 3A is situated on the inner side, and the silica fiber mat 3B is situated on the outer side. The resulting laminate is compressed to have a certain thickness to obtain a cylindrical holding material.

EXAMPLES

The invention is further described below by way of examples. Note that the invention is not limited to the following examples.

Example 1

Alumina fibers ($Al_2O_3$: 96.0 wt %, $SiO_2$: 4.0 wt %) and an organic binder (acrylic resin) (10 wt % based on the total amount (=100 wt %) of the inorganic fibers and the organic binder) were dispersed in water to prepare an aqueous slurry.

The aqueous slurry was poured into a dehydration die having a wire gauze, and subjected to dehydration forming to obtain a wet alumina fiber formed article.

A wet silica fiber formed article was obtained in the same manner as described above, except that silica fibers ($Al_2O_3$: 2.0 wt %, $SiO_2$: 98.0 wt %) were used instead of the alumina fibers. Note that the silica fibers used as the raw material were heated in advance.

The wet alumina fiber formed article and the wet silica fiber formed article were stacked, and heat-pressed at 170° C. to melt the binder and bond the wet alumina fiber formed article and the wet silica fiber formed article to obtain a laminated formed article.

The laminated formed article was worked to have a disc-like shape, and heated (calcined) at 700° C. for 1 hour to obtain a holding material in the shape of a disc having a diameter of 50.8 mm and a thickness of 10 mm. The holding material was a laminate including an alumina fiber mat (700 g/m$^2$) and a silica fiber mat (900 g/m$^2$).

Comparative Example 1

A holding material was produced in the same manner as in Example 1, except that only the alumina fibers were used without using the silica fibers. The holding material was a single-layer product of an alumina fiber mat (1,600 g/m$^2$).

A mat having a thickness of 8 mm was produced in the same manner as described above. The surface pressure of the resulting mat was measured as described below. The surface pressure of the mat measured at a gap bulk density of 0.30 g/cm$^3$ was 20.4 N/cm$^2$, the surface pressure of the mat measured at a gap bulk density of 0.40 g/cm$^3$ was 44.5 N/cm$^2$, and the surface pressure of the mat measured at a gap bulk density of 0.50 g/cm$^3$ was 75.8 N/cm$^2$.

The surface pressure was measured using a universal tester ("Autograph" manufactured by Shimadzu Corporation). Platens (compression jig) (diameter: 100 mm, thickness: 25 mm) were provided on the upper side and the lower side, and a position at which the gap between the upper platen and the lower platen was 8 mm was set to be a zero-point position. The mat produced as described above was placed on the lower platen, and compressed from the zero-point position at a compression rate of 1 mm/min. The gap bulk density and the surface pressure were calculated using the following expressions.

Gap bulk density (g/cm$^3$)=weight (g/m$^2$) per m$^2$ of mat/compression stroke amount (mm)/1,000

Surface pressure (N/cm$^2$)=load (N) due to compression/area (cm$^2$) of specimen Comparative Example 2

A holding material was produced in the same manner as in Comparative Example 1, except that only the silica fibers were used without using the alumina fibers. The holding material was a single-layer product of a silica fiber mat (1,600 g/m$^2$).

A mat having a thickness of 8 mm was produced in the same manner as described above. The surface pressure of the resulting mat was measured in the same manner as in Comparative Example 1. The surface pressure of the mat measured at a gap bulk density of 0.30 g/cm$^3$ was 26.9 N/cm$^2$, the surface pressure of the mat measured at a gap bulk density of 0.40 g/cm$^3$ was 69.6 N/cm$^2$, the surface pressure of the mat measured at a gap bulk density of 0.50 g/cm$^3$ was 127.4 N/cm$^2$ and the surface pressure of the mat measured at a gap bulk density of 0.60 g/cm$^3$ was 192.0 N/cm$^2$.

Evaluation Example 1 (Hot Surface Pressure Test)

Figure 2:
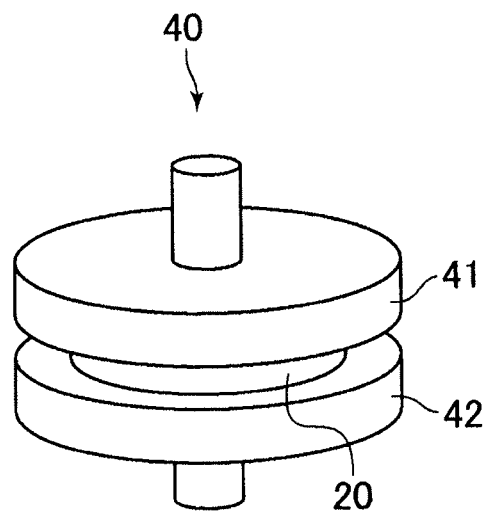
FIG. 2 is a perspective view illustrating the hot surface pressure tester used in Evaluation Example 1.

The holding material was subjected to a hot surface pressure test using a tester 40 illustrated in FIG. 2 ("Servopulser" manufactured by Shimadzu Corporation) to measure the surface pressure of the holding material. The tester 40 included an upper platen 41 (i.e., a member that corresponds to the processing structure) (disc (diameter: 80 mm, thickness: 30 mm) formed of Inconel (registered trademark)), and a lower platen 42 (i.e., a member that corresponds to the casing) (disc (diameter: 80 mm, thickness: 30 mm) formed of Inconel (registered trademark)) that was placed opposite to the upper platen 41.

The holding material produced as described above was placed between the upper platen 41 and the lower platen 42 so that the distance between the upper platen 41 and the lower platen 42 (i.e., the thickness of the holding material 20 placed between the upper platen 41 and the lower platen 42) was 4 to 5 mm. The holding material of Example 1 was placed between the upper platen 41 and the lower platen 42 so that the alumina fiber mat came in contact with the upper platen 41.

A load of 12 N/cm$^2$ was applied to the holding material 20 using the upper platen 41 and the lower platen 42, and the upper platen 41 and the lower platen 42 were heated to 900° C. and 700° C., respectively, over about 10 minutes. The surface pressure was measured during heating. The results are shown in Table 3. The repulsion force (per unit area) applied to the upper platen 41 from the holding material 20 placed between the upper platen 41 and the lower platen 42 was measured, and taken as the surface pressure (N/cm$^2$).

Figure 3:
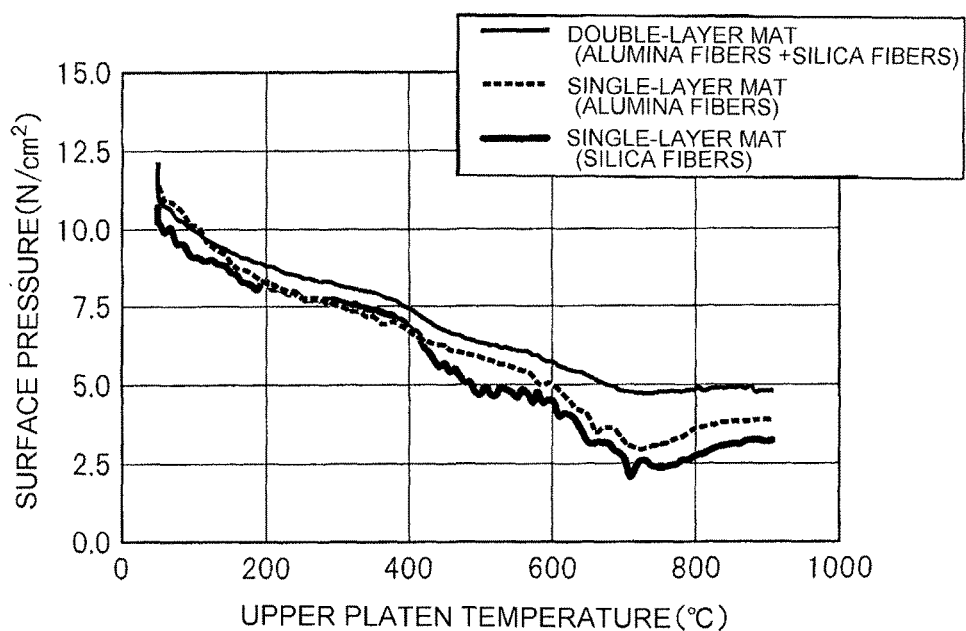
FIG. 3 is a graph illustrating the hot surface pressure measurement results for the holding materials obtained in Example 1 and Comparative Examples 1 and 2.

As shown in FIG. 3, the holding material of Example 1 decreased in surface pressure to only a small extent as compared with the holding materials of Comparative Examples 1 and 2 even when the organic binder burned down due to heating.

Evaluation Example 2 (Compression Recovery Test)

The holding material having a thickness of 10 mm was compressed to a thickness of 5 mm by applying a load using the test jig illustrated in FIG. 2, and heated to 400° C. The compression state was then released by removing the jig, and the recovery state was observed.

The recovery rate of the holding material of Example 1 was about 180%, the recovery rate of the holding material of Comparative Example 1 was about 110%, and the recovery rate of the holding material of Comparative Example 2 was about 160%. A high recovery rate indicates that the surface pressure with respect to the expansion of the casing upon heating is high.

The holding material of Example 1 has the thermal resistance of the alumina mat and at the same time a decrease in surface pressure thereof can be reduced since the alumina mat preferentially collapses with respect to the silica mat and the amount of damage to the silica mat can be reduced.

INDUSTRIAL APPLICABILITY

The holding material according to the invention may be used for a gas treatment device for purifying exhaust gas discharged from an automobile or the like, for example.

Although only some exemplary embodiments and/or examples of the invention have been described in detail above, those skilled in the art will readily appreciate that many modifications are possible in the exemplary embodiments and/or examples without materially departing from the novel teachings and advantages of the invention. Accordingly, all such modifications are intended to be included within the scope of the invention.

The documents described in the specification, and the specification of the Japanese patent application to which the present application claims priority under the Paris Convention, are incorporated herein by reference in their entirety.

The invention claimed is:

1. A holding material comprising:
    a first mat comprising inorganic fibers of only a first type, the first type of inorganic fibers being alumina fibers that comprise 60 wt % or more of alumina and 40 wt % or less of silica; and
    a second mat comprising inorganic fibers of only a second type, the second type of inorganic fibers being silica fibers that comprise 60 wt % or more of silica and 40 wt % or less of alumina, and having a surface pressure higher than that of the first mat as measured at a gap bulk density of 0.30 g/cm$^3$,
    wherein the holding material is configured to be placed in a gap between a processing structure and a casing in a gas treatment device with the processing structure disposed in the casing, such that the first mat of the holding material comes in contact with the processing structure.

2. The holding material according to claim 1, wherein either or both of the first mat and the second mat further comprise 1 to 20 wt % of an organic binder.

3. The holding material according to claim 1, having a thickness of 6 mm to 20 mm.

4. The holding material according to claim 1, the holding material being a cylindrical laminate in which the first mat is situated on an inner side, and the second mat is situated on an outer side.

5. A method for producing the holding material of claim 1, comprising:
    producing the first mat using the first type of inorganic fibers;
    producing the second mat using the second type of inorganic fibers, the second mat having the surface pressure higher than that of the first mat; and
    stacking and bonding the first mat and the second mat.

6. A gas treatment device comprising:
    the processing structure having a tubular shape;
    the casing that accommodates the processing structure therein; and
    the holding material of claim 1 that is placed in the gap between the processing structure and the casing,
    wherein the first mat of the holding material is situated to come in contact with the processing structure.

7. The gas treatment device according to claim 6, wherein the processing structure is a catalyst carrier or an exhaust gas filter.

* * * * *